July 5, 1960 A. H. DICKINSON 2,943,907
APPARATUS FOR MAKING MAGNETIC RECORDINGS
Filed April 16, 1954 7 Sheets-Sheet 1

INVENTOR
Arthur H. Dickinson
BY
Pennie, Edmonds, Morton, Barrows & Taylor
ATTORNEY July 5, 1960 A. H. DICKINSON 2,943,907
APPARATUS FOR MAKING MAGNETIC RECORDINGS
Filed April 16, 1954 7 Sheets-Sheet 5

INVENTOR.
Arthur H. Dickinson
BY
Pennie, Edmonds, Morton, Barrows & Taylor

July 5, 1960  A. H. DICKINSON  2,943,907
APPARATUS FOR MAKING MAGNETIC RECORDINGS
Filed April 16, 1954  7 Sheets-Sheet 6

INVENTOR.
Arthur H. Dickinson
BY
Pennie, Edmonds, Morton, Barrows & Taylor

July 5, 1960  A. H. DICKINSON  2,943,907
APPARATUS FOR MAKING MAGNETIC RECORDINGS
Filed April 16, 1954  7 Sheets-Sheet 7

INVENTOR.
Arthur H. Dickinson
BY
Pennie, Edmonds, Morton, Barrows & Taylor

United States Patent Office 2,943,907
Patented July 5, 1960

2,943,907
APPARATUS FOR MAKING MAGNETIC RECORDINGS

Arthur H. Dickinson, Greenwich, Conn., assignor to International Business Machines Corporation, New York, N.Y., a corporation of New York Filed Apr. 16, 1954, Ser. No. 423,816

14 Claims. (Cl. 346—74)

This invention relates to a method of representing numerical data and to apparatus for producing such representations.

More specifically, this invention relates to a method and apparatus wherein magnetic recordings of numerical significance are made on a magnetizable medium such as a magnetizable IBM card wherein each digit is represented by a different discrete magnetic condition resulting from a distinct rate of change in the voltage applied to the recording head of a magnetic recording instrument during the recording of the digit whereby different electronic responses are obtained in an electronic computing machine from each different magnetic recording.

In the application Serial No. 423,774 to Arthur H. Dickinson, filed April 16, 1954, concurrently herewith, there is described a method for utilizing such cards in an IBM electronic computing machine in lieu of the cards wherein each digit is represented by the position of one recording in each column of the card. By this invention the number of digits that may be recorded on a single card is not limited to the separate columns permitted by the width of the card but is multiplied by the number of separate rows of magnetic recordings that may be impressed on the card without overlapping, and the capacity of the computing machine for the same rate of the cards therethrough is correspondingly multiplied.

It is well known that the density of the remanent flux in the magnetized areas of a card or other recording media are proportional to the magnetomotive force applied in the making of the record and that the electric currents initiated by the passage of such magnetized areas in operative relation with a responsive pick-up coil will vary in accord with the remanent flux density. Hence, if the rate of change of the voltage applied to the magnetic recording head from zero to a desired maximum is different for each digit during its passage past the recording head, the nature of the electrical response during the passage of each recording past the pick-up head in the computing machine will be different for each digit. In the method of recording herein described, the time interval of recording each digit is the same during a portion of which time interval the flux density in the magnetized portion of the passing card is built up from zero to a maximum and is continued at this maximum for the balance of the time interval, the portions of the interval during which the magnetic flux is built up and, inversely, the portions of the interval during which the maximum magnetic flux is impressed being different for each digit.

For carrying out my invention I have provided a machine for producing in magnetizable IBM cards successive rows of recordings by means of a series of recording heads, one for each column of the card, all the recordings in each row being simultaneously made during the successive movements of the card and in such machine I have utilized various structural features of the standard IBM card punching machine such as the keyboard, card magazine, etc. modified as required. In the accompanying drawings I have illustrated a machine having thirty recording heads for cards having thirty columns but any number more or less may be employed.

In the said drawings:

Fig. 5a is a sectional view on line 5a—5a of Fig. 1;

Figure 11:
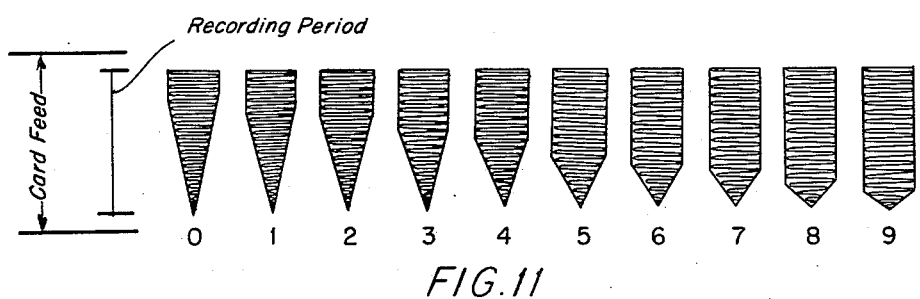
Figure 12:
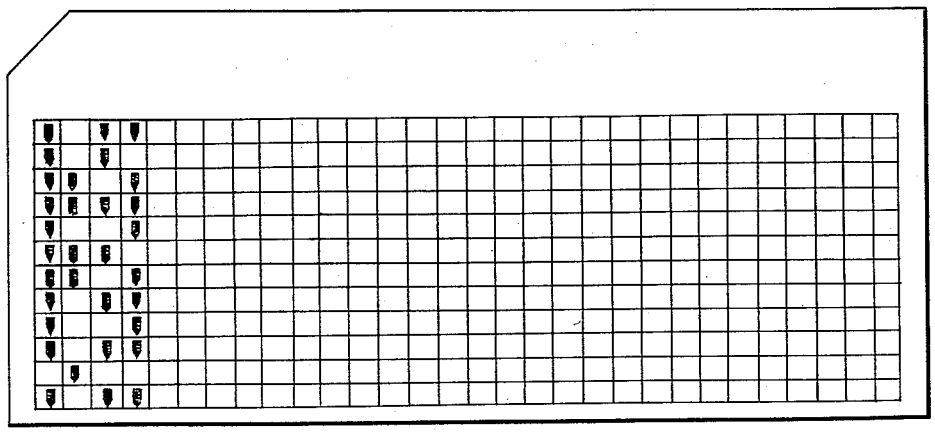

Fig. 11 similarly illustrates the impressed voltage in recording all the digits; and Fig. 12 shows a card with the recordings indicated as in Fig. 11.

For each column of card capacity there is provided a separate keyboard section, and separate erasing heads and recording heads. For each key there is provided a separate condenser, the capacity of the condensers being different for the different digits represented by the different keys and the different discharges from these condensers of different capacity are utilized to differently modify the operation of the recording head to produce in the card a different recording for each digit of the character above described.

The machine is equipped with the usual reciprocating picker mechanism for advancing the individual record cards from the card magazine to a pair of feed rolls which serve to advance the cards at each operation past the erase and record heads the distance required for making one row of recordings across the card. The initial feed movement of the card from the magazine brings it to rest in position to receive the first row of magnetic recordings. The keys representing the digits to be recorded in the several columns are then punched, the keys being held down by a suitable latch mechanism. As each key is depressed the condenser associated with it is operatively connected to the magnetizing circuit of the recording head for that column so that the recording in that column will represent the digit indicated by the depressed key. After the proper keys in all the columns where recordings are to be made are depressed, a switch is closed by the operator, whereupon the feed rolls are operated to advance the card with respect to the recording heads, the recording head circuits are energized, the proper recordings are made in each column where a key was depressed, the depressed keys are released, the recording head circuits are opened and the feed rolls are stopped with the card in position to receive a second row of recordings. When the desired recordings have been made in all the rows, a second pair of feed rolls carries the card to the stacker. When this second pair of feed rolls is set in motion at the completion of the final row on the card, the card feed picker is actuated to feed a second card from the magazine and the first pair of feed rolls are operated for a prolonged period sufficient to bring the second card into position to receive the first row of recordings.

For each "record cycle" the card is advanced one-quarter inch whereas the feed movement required to bring the card into position for the first "record cycle"

requires a movement of three and a half inches. This dual operation of the feed rollers is accomplished by a differential gear mechanism which will now be described along with the other mechanical features of the machine. These distances are optional and are those required to make twelve rows of recordings on an IBM card of usual dimensions.

Figure 1:
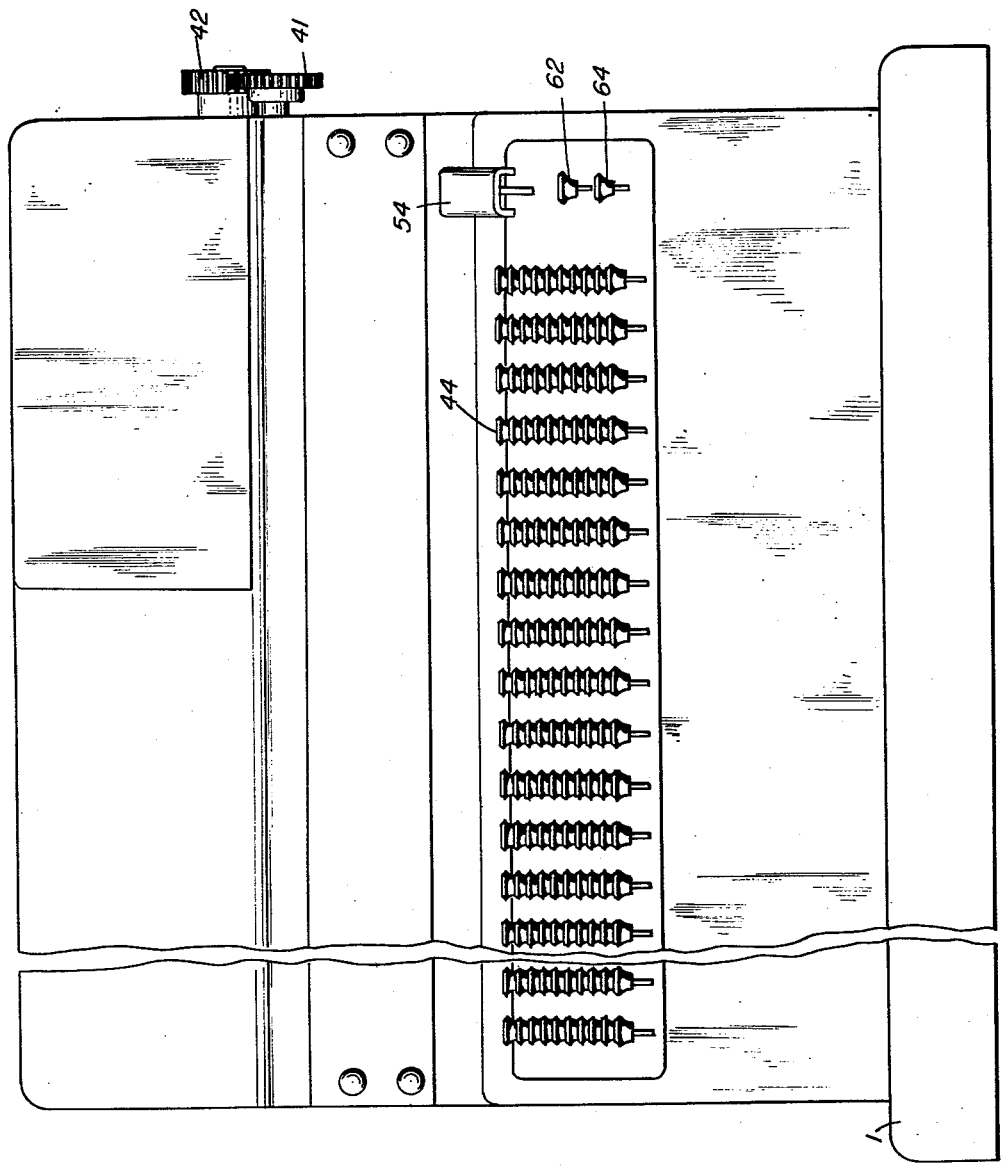
Fig. 1 is a front elevation of the machine.
Figure 2:
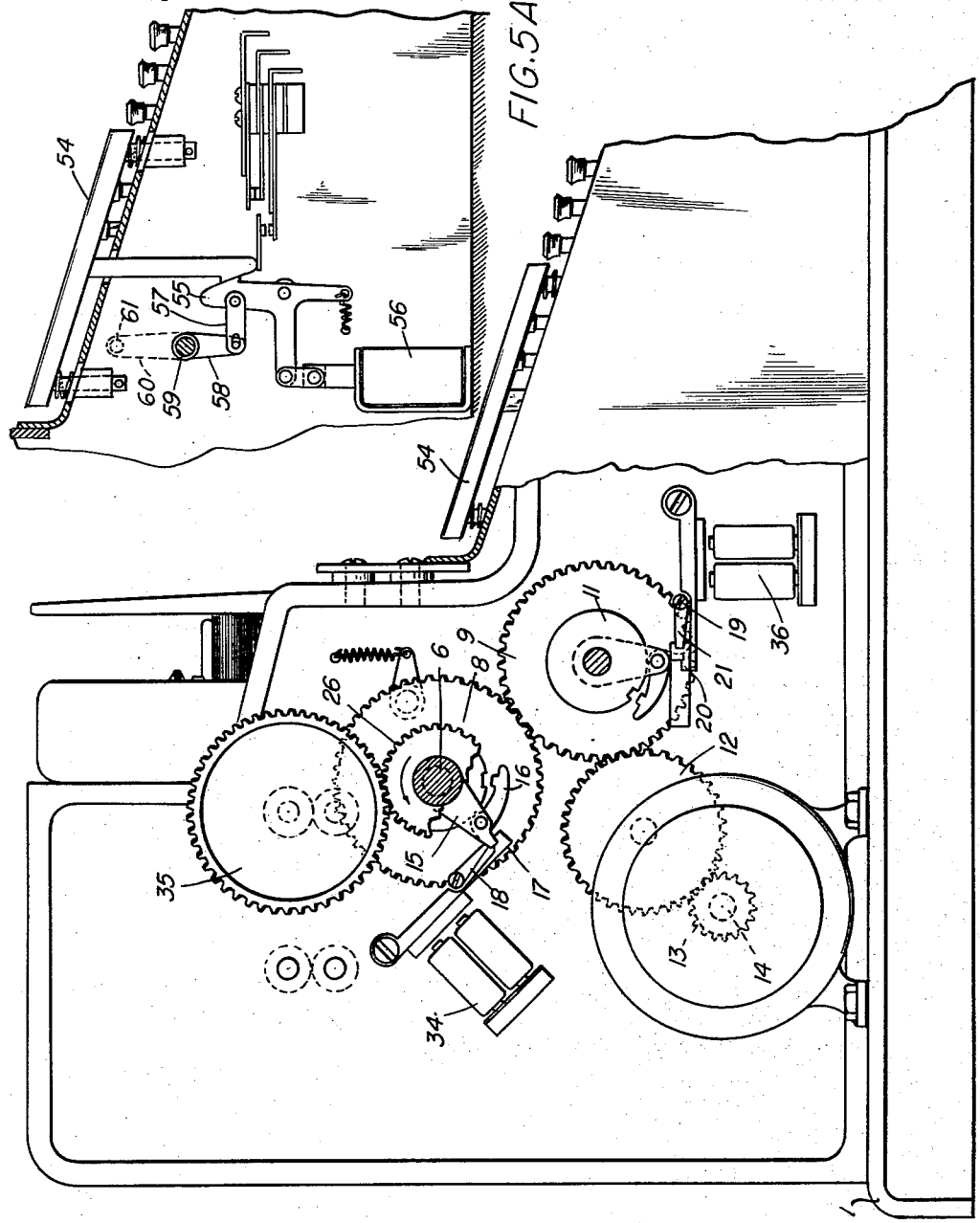
Fig. 2 is a vertical sectional view on line 2—2 of Fig. 3 showing a portion of the driving mechanism for the card feed.
Figure 3:
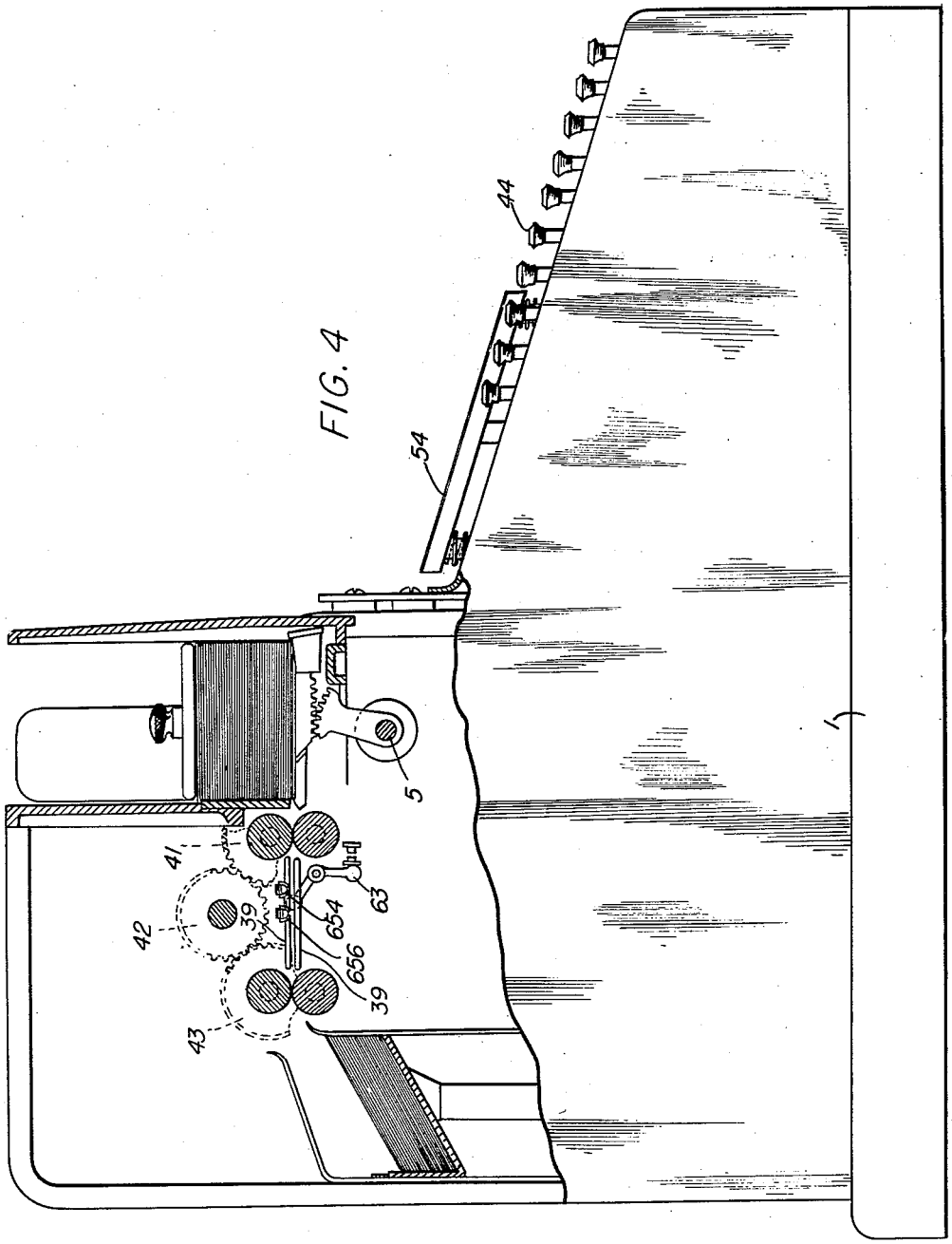
Fig. 3 is a plan view of the card feeding mechanism as it appears with the top wall of the casing removed.

Referring particularly to Figs. 1, 2 and 3 the machine comprises two sections, the keyboard section and a card feeding and recording section. As the cooperation between the two sections is entirely electrical, the two sections may be physically separate but ordinarily the two sections will be embodied in a single machine as shown.

The machine comprises a base 1 on the rearward part of which the card feeding mechanisms are mounted. This portion of the machine has three vertical frames or walls 2, 3 and 4 (see Fig. 3). Journalled in walls 2 and 4 is a shaft 5 which operates the picker knives of the card magazine in the usual manner. Journalled in frames 3 and 4 is a shaft 6. Shaft 6 carries the usual cam 5a which oscillates shaft 5 of the picker knives in order to feed the bottom card from the hopper into the first pair of feed rolls. The picker mechanism is of usual construction and will not be further described.

Rotatably mounted on shaft 6 is a single toothed driving element 7 which is integral with a gear 8. Gear 8 meshes with a gear 9 which is rotatably mounted on a shaft 10 journalled in the frames 3 and 4. Gear 9 is integral with a similar single notch driving element 11. Meshing with gear 9 is a gear 12 which in turn meshes with a gear 13 mounted on the motor shaft 14. It will be seen that rotation of the motor shaft 14 will cause rotation of the driving element 7 of shaft 6 in a counterclockwise direction as viewed in Fig. 2 and the rotation of the single notch driving element 11 of shaft 10 in a clockwise direction. Shaft 6 has fastened to it the usual clutch arm 15 to which is pivoted the clutch dog of a well known type of single revolution clutch. Normally shaft 6 is held against rotation by the engagement of clutch arm 15 with the latch armature 17 and keeper 18. In the same way, shaft 10 is normally held against rotation by clutch arm 19 which is engaged by armature latch arm 20 and keeper 21. By this arrangement shaft 6 will be given one complete revolution from the motor shaft whenever the circuit through the magnet 34 which controls the armature 17 is closed and shaft 10 will be given one complete revolution when the circuit through magnet 36 of the armature 20 is closed.

Referring to Fig. 3, shaft 6 has pinned to it the cross shaft 22 on which are rotatably mounted two bevel pinions 23 and 24 forming part of the above-mentioned differential gear. These pinions 23 and 24 mesh with a bevel gear 25 which is integral with a spur gear 26 and is rotatable on shaft 6. Pinions 23 and 24 also mesh with a bevel gear 27 which is integral with a spur gear 28 and is also rotatable on shaft 6. The upper shaft 29 of the first pair of feed rolls is driven through this differential and when shaft 10 is the driving member of the differential the feed rolls will feed the card a distance of one-quarter inch as required for each record cycle and when shaft 6 is the driving member of the differential the feed rolls will advance the card the three and one half inches required to feed the card delivered from the magazine to a position to receive the first recording.

A gear 30 is fastened to shaft 10 and meshes with a gear 31 which, with an integral gear 32, are mounted on a stud 33. Gear 32 in turn meshes with the spur gear 28 which is integral with bevel gear 27 of the differential. Hence, when shaft 10 is held against rotation by armature latch 20, bevel gear 27 is also held against rotation.

If the magnet 34 is energized, it will attract the armature latch 17 and release the dog 16 thereby imparting a shaft 6 a single rotation. Shaft 6, in rotating, will cause rotation of gear 25 in a counterclockwise direction as indicated by the arrow. As gear 25 is integral with gear 26 which meshes with gear 35, fastened to the feed roll shaft 29, the feed rolls will be rotated a sufficient amount to feed a card the three and one half inches required to bring the card to the required initial position.

As previously explained, shaft 6 carries the usual cam which oscillates the picker knives and the dimensions of parts is such that one revolution of shaft 6 is sufficient to feed a card from the magazine into the first pair of feed rolls and cause it to be advanced to the first recording position.

The cards are of a size to receive twelve separate rows of recorded digits and after the card is fed to the first recording position it is advanced in increments of one-quarter inch at a time, during which movement the successive magnetic recordings are made in separate rows across the card. These successive movements for each record cycle are accomplished by energization of magnet 36 to impart a single revolution to shaft 10 and to gear 30 fastened thereto. Gear 30 drives gears 31 and 32 and gear 32 in turn drives the gear 28 rotatably mounted on shaft 6. Gear 28 thus serves as the driving gear of the differential and through the pinions 23 and 24. As the cross shaft 22 is held stationary by shaft 6 pinions 23 and 24 rotate on their own axes and drive gear 25. Due to the gear reduction between shaft 10 and gear 27, one revolution of shaft 10 rotates feed roll shaft 29 a correct amount to feed the card the linear distance required for one record cycle, that is, one-quarter inch. During this recording cycle the circuit of magnet 36 is opened so that the card comes to rest and remains so until the keys are punched to select another row of digits to be recorded during the succeeding cycle. The recording heads 656 are positioned as shown in advance of the first pair of feed rolls and the erasing heads 654 positioned between the feed rolls and the recording heads to insure a complete demagnetization of the card before it reaches the recording heads.

Figure 4:
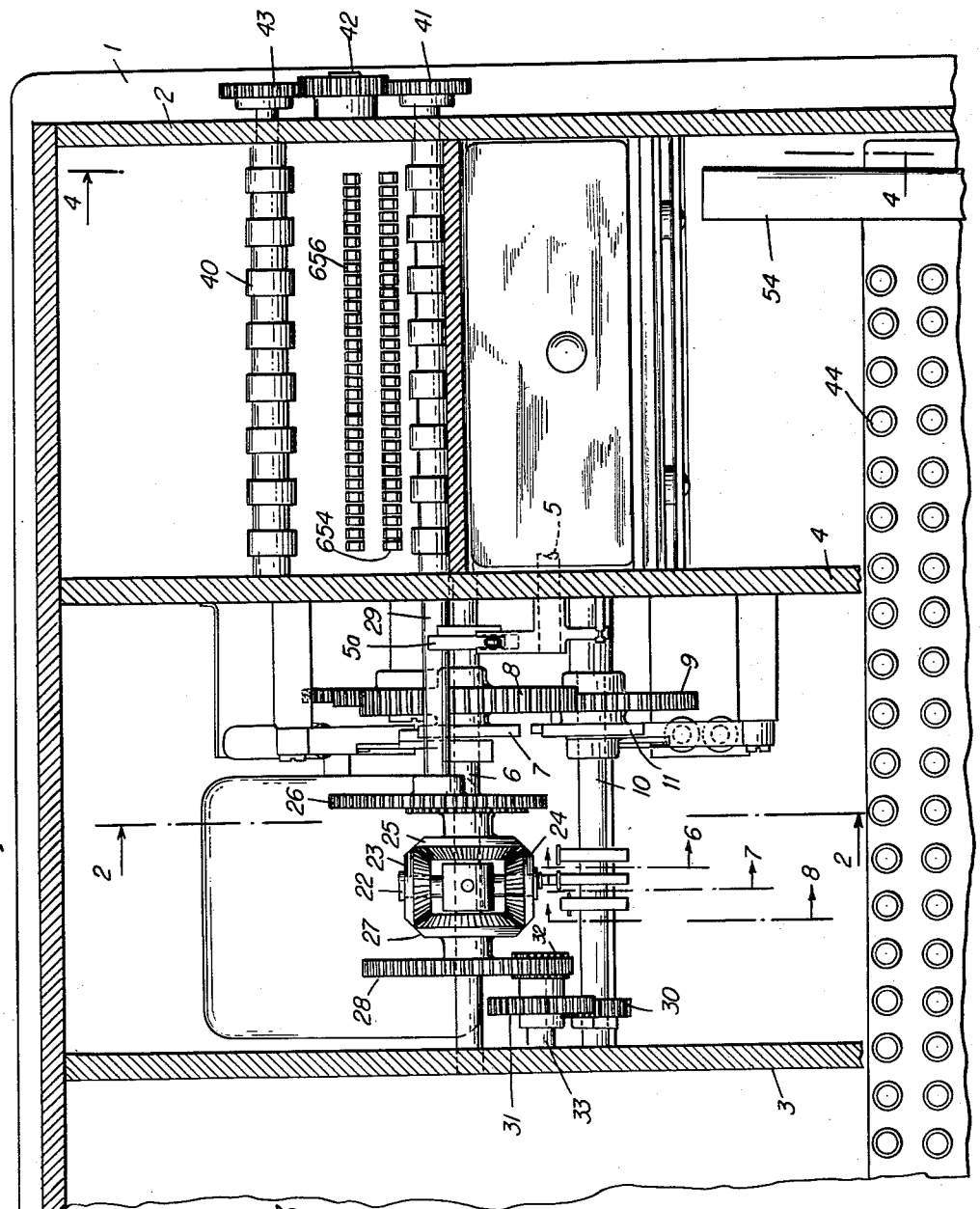
Fig. 4 is a side view of the machine with the upper portion of the machine in section on line 4—4 of Fig. 3.

The cards are supported in their passage beneath the erasing and recording heads by guide plates 39 and beyond the guide plates a second pair of feed rolls 40 is provided to deliver the cards to the receiving hopper. These rolls are driven in unison with the first pair of rolls by a gear 41 on the shaft 29 of the first pair of rolls, an intermediate gear 42 and a gear 43 on the shaft of the upper roll of the second pair. Beneath the cards is a switch 63 whose upstanding arm is in the path of the card so that the switch is closed, whenever a card is present (see Fig. 4).

At the conclusion of the predetermined number of recording cycles the magnet 34 is again energized to drive the feed rolls from the shaft 6 and thereby advance the finished card into the receiving hopper and bring another card into position for the first recording.

Figure 5:
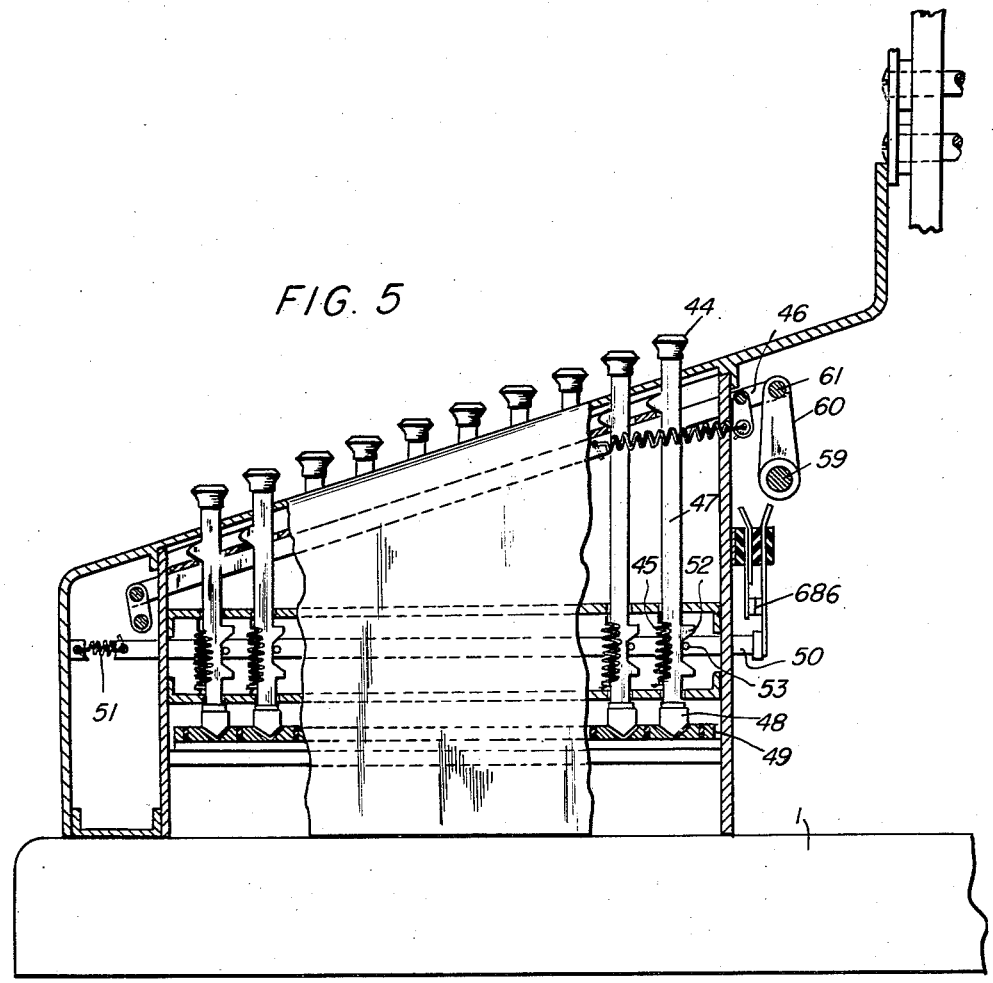
Fig. 5 is a side view, partly in section, of the keyboard.
Figure 6:
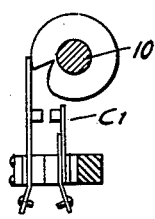
Figs. 6, 7 and 8 are detail views of three cam operated switches which control certain steps in the sequence of operation.
Figure 7:
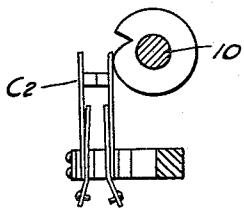
Figure 8:
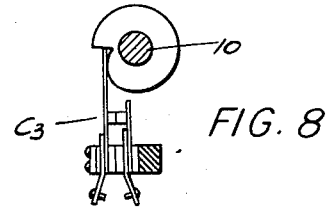

The keyboard comprises thirty columns of individual keys. There are ten keys in each column being numbered 0 through 9 (see Fig. 5). Each key 44 is normally held in elevated position by an associated spring 45 and is latched in the depressed position by a latch bar 46 (of which one is provided for each column of keys). Each key bar 47 is provided with a V-shaped conducting portion 48 adapted to engage, upon depression of the associated key, the related contact 49. These members 48 and 49 constitute the switch whereby the condenser of the proper capacity for the particular digit represented by the key is connected to the magnetizing circuit.

In addition to the latch bars 46, supplemental control or no entry bars 50 are also provided one for each column of keys. Upon the depression of any key in a column the corresponding bar 50 is cammed outwardly (to the right as viewed in Fig. 5) against the action of spring 51 by the camming edge 52 on key bar 47 in cooperation with the stud 53 fastened to no entry bar 50. The outward movement of such bar is adapted to open contacts 686, the effect of which will be later described.

Also mounted on the keyboard is a motor bar 54 which is depressed to initiate the recording cycle after the selected keys are depressed (Fig. 5a). By means of a latch lever 55, the depressed bar is maintained so, due to the engagement of the bar with the latch lever. The motor bar 54 is released near the end of a recording cycle by means of a solenoid 56 which is energized to restore the motor bar to its normal position. The energization of the solenoid 56 causes the latch lever 55 to be partially rotated in a clockwise direction, thereby releasing the latched stem of the motor bar. During the said rotation of the latch lever 55 and after the release of the motor bar, the link 57 causes lever 58 to be partially rotated and in turn to rotate the shaft 59 in a counterclockwise direction. Shaft 59 extends across the keyboard and at each end has an attached arm 60 whose outer ends are connected by a transverse bail 61 contacting the rear ends of the latch bars 46 and which, upon being rocked, thrusts the latch bars 46 forwardly releasing the depressed keys which have been latched down.

Also mounted on the keyboard is a card feed switch 62 which is closed to advance the first card from the magazine.

Figure 9:
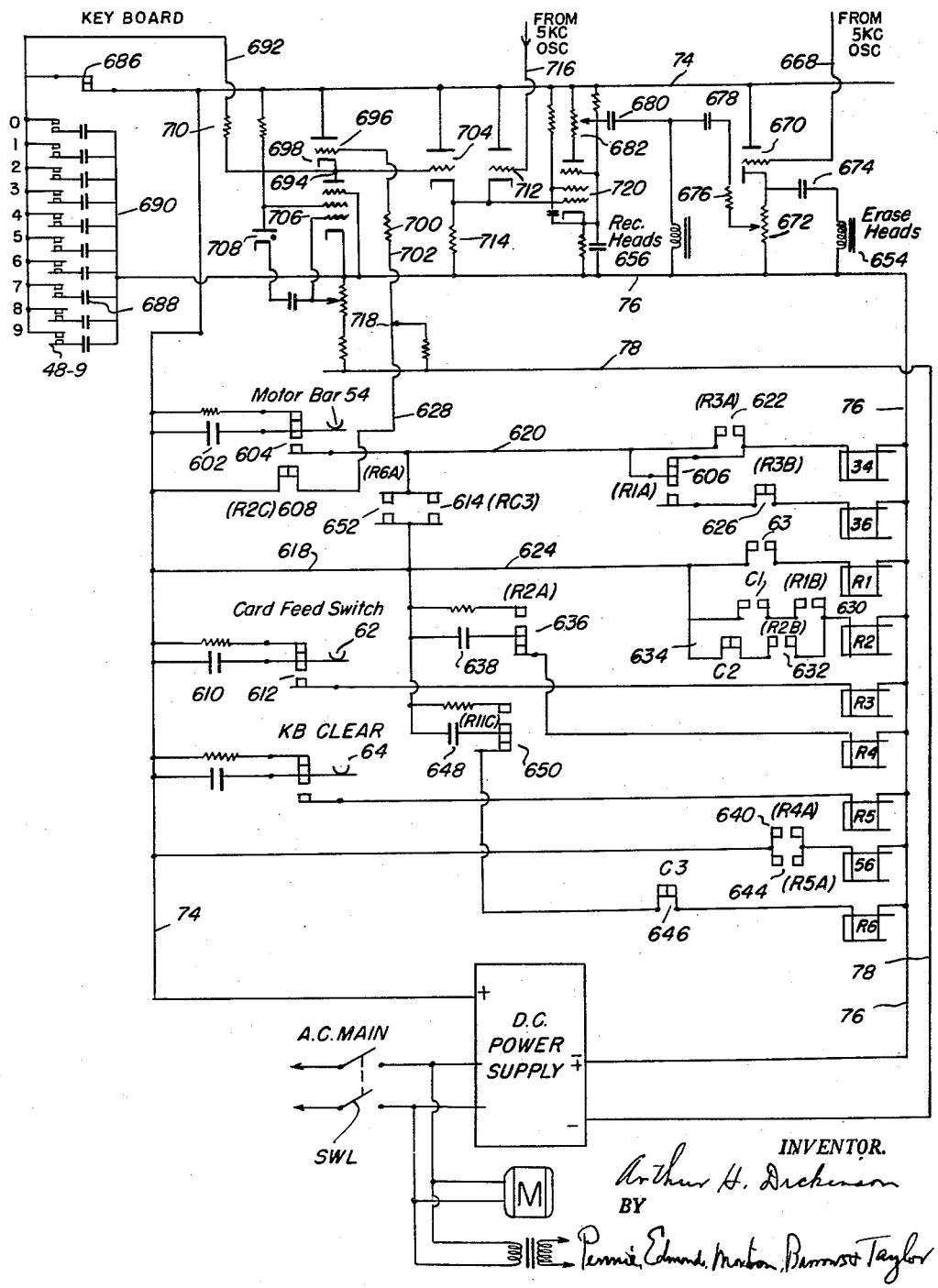
Fig. 9 is a diagram showing the magnetic recording instrumentalities and the control circuits.

Fig. 9 shows the control circuits of the machine. It is placed in operation by closing SWL which supplies A.C. power to the drive motor, filament transformer and the input to the D.C. power supply. The filament wiring has been omitted and the D.C. power supply shown in block form only for simplicity. After the vacuum tubes have reached their operating temperature and D.C. potentials are supplied to wires 74, 76 and 78, the device may be operated. As indicated, 76 is the ground wire of the D.C. circuit and 78 has a negative potential with respect to 76.

Having placed magnetizable cards in the hopper, it is now necessary to advance the first blank card up to the record position. The card feed switch 62 is closed and a normally discharged condenser 610 is charged through contacts 612 and through relay coil R3. R3 is thus momentarily picked up during the charging of condenser 610 and a circuit is completed from wire 74, wire 618, through points 614, via wire 620, through points 622 and clutch magnet coil 34 to wire 76. Shaft 6 is thus given one complete revolution and the first card is fed to position to receive the first row of recordings as previously described. Near the end of the card feed the leading edge of the card engages the upstanding arm switch 63 and closes the switch, thereby energizing relay R1, current flowing from wire 74, through 618, 624, switch 63, relay coil R1 to wire 76. Relay R1 remains energized until switch 63 again opens. The proper keys for the first entry on the card are now depressed and the selected keys will be latched in this position. The motor bar 54 is now depressed and a recording cycle is initiated.

When motor bar 54 is depressed and contacts 604 are closed, discharged condenser 602 charges through points 604, wire 620, through transferred R1A points 606, through now closed R3B points 626 and coil 36 to line 76. As previously described, energizing coil 36 initiates a record cycle and feeds the card the required linear distance for one recording through a single revolution of shaft 10. Shaft 10 has attached to it three cams which respectively open and close three switches C1, C2 and C3 through which the sequence of operations during the recording cycle is secured. When the shaft 10 has turned through approximately 36° switch C1 closes momentarily thereby completing the circuit through the coil of relay R2 from wire 74 through wires 618, 624, through C1, now closed R1B contacts 630, through R2 coil to wire 76. When R2 picks up, it is held up through its hold points 652 (R2B) and normally closed C2 contacts 634. At approximately 36° before the rotation of shaft 10 is completed, cam contact C2 momentarily opens breaking the R2 holding circuit and R2 drops out. It is during this interval that the actual recording takes place.

The recording heads 656 and erase heads 654 are of conventional design and are similar in appearance. The recording heads are designed for use with a high frequency biasing voltage which enables virtually distortionless recording. Since this method of magnetic recording is well known in the magnetic recording art and is employed in many applications, further discussion of its operating characteristics will not be given here. The erase heads are constructed with larger, non-critical gaps and are located ahead of the recording heads as the card passes through the machine.

Two sine wave oscillators (not shown) of the type commonly referred to as "Series Fed Hartley Oscillators" are employed. The output of one is approximately 5 kc. and the output of the other is approximately 50 kc. The low frequency oscillator is the source of voltage applied at various rates of increasing amplitude to the recording head. The high frequency oscillator is the source voltage for the erasing head and also serves as the source voltage for the high frequency bias supplied to the recording head.

The erasing process is accomplished as follows. The output of the 50 kc. oscillator is fed via wire 668 to the grid of a cathode follower 670 (see Fig. 9). Since there are 30 erasing heads in the device, the cathode follower 670 functions as an impedance matching device to prevent overloading of the transformer of the oscillator. The resulting high frequency voltage appearing across resistor 672 is applied through condenser 674 to the erase head 654.

By feeding a relatively high voltage to the erase head sufficient stray flux is produced near the lagging and leading edges of the gap to subject the magnetizable area on the card gradually to an increasing and then a constantly decreasing field. At conventional machine speeds, each magnetic particle in the card is subjected to well over 150 gradually decreasing cyclic fields within .025" of card travel which is more than adequate number of reversals to completely erase any material on the card.

The voltage across the resistor 672 is also applied from the tapped point through resistor 676 and condenser 678 to the recording head 656 as a source of high frequency bias. Its level as it appears on the recording head may be adjusted by moving the tap on resistor 672. During a recording cycle, there is mixed with this bias voltage a modulated 5 kc. voltage having a waveform representative of the digit selected in the keyboard. The method of producing these modulated 5 kc. waveforms will now be described with reference to Fig. 10 wherein the recording for digit "7" is illustrated.

When the number "7" key is depressed in the number one column of the keyboard contacts 48–9 through the condenser 688 of the "7" key are closed and contacts 686 opened. Contacts 686 open whenever a key is depressed in a column and remain closed if no selection is made. One side of condenser 688 is connected via wire 690 to the "ground" line 76. The other side is connected via wire 692 through a low value current limiting resistance 710 to the cathode-anode junction 694 of triode 698 and pentode 706. The grid 696 of triode 698 is connected to the positive line 74 of the D.C. circuit through resistor 700 via wire 702, wire 628 through normally closed contacts 608. Thus, the grid potential of triode 698 is near that of line 74. The cathode of triode 698 is then also near line 74 and when the #7 key was depressed in the first column, condenser 688 was charged up to the potential difference existing between junction 694 and ground. Triode 698 is a charging means for any keyboard condenser selected by the depression of a keyboard key. Pentode 706 is a constant current discharge means for discharging the selected condenser during the recording cycle at a constant rate. The rate of discharge is directly proportional to the value of capacitance involved because the discharge current is a constant. An adjustment in the grid #1 bias by means of a potentiometer in the grid resistor circuit may be made to adjust the pentode anode current. A voltage regulator tube 708 is provided to maintain constant screen potential for pentode 706 for linearity.

In a recording cycle, when relay R2 picks up contacts 608 on this relay open. When contacts 608 open, point 718 assumes the potential of wire 78, more negative than ground. Since grid 696 of triode 698 is connected through resistor 700 via wire 702 to this point, conduction through this triode ceases and the constant current flow in pentode 706 begins to discharge condenser 688. As condenser 688 discharges, the potential of junction 694 begins to decrease at a constant rate and continues to do so. Junction 694 is connected to the grid of triode 704 which gates the output of a cathode follower 712 in the following manner. The output of the 5 kc. oscillator is fed via wire 716 to the grid of triode 712. Since triode 712 is connected as a cathode follower, were it not for the action of triode 704, the voltage across resistor 714 would reach positive value approximately equal to the positive excursion of the grid of 712. As the grid of 712 decreases in potential, the voltage across the cathode resistance 714 would similarly decrease until zero drop was reached. During the negative travel of 712 grid, the voltage would remain at zero. The voltage across resistor 714 therefore would increase to a maximum and fall to zero 5,000 times per second. Triode 704 is also connected as a cathode follower and the potential on its grid determines the minimum voltage drop across resistor 714. Normally with junction 694 at its most positive point, the conduction of triode 704 is such that no 5 kc. output voltage appears across resistor 714. As junction 694 decreases in potential, during a recording, the voltage across resistor 714 decreases a like amount. It is returned, however, to its original peak value at a 5 kc. rate by the action of cathode follower 712. It may be said that the 5 kc. signal impressed on triode 712 is modulated at the sawtooth rate through the action of triode 704. The modulated waveforms appearing across resistor 714 are amplified by means of a linear amplifier pentode 720.

Figure 10:
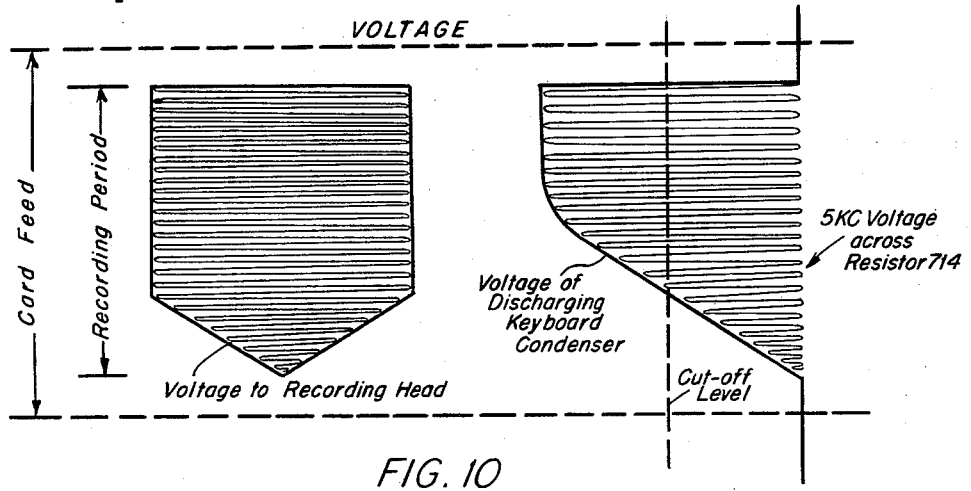
Fig. 10 shows the wave pattern of the oscillating current in recording the digit 7, and illustrates graphically the impressed voltage during the recording of the digit.

It should be pointed out that near the end of the discharge of condenser 688, the "knee" of the constant current curve is reached and non-linearity of discharge may begin. Before this point is reached, the voltage amplitude across resistor 714 is such that on its negative excursion pentode 720 is cut off, thus even though condenser 688 continues to discharge, beyond a certain point no further increase in the voltage across potentiometer 682 occurs. Fig. 10 shows the waveforms at the various points discussed.

By means just described, the digit representing waveforms consisting of a modulated envelope of 5 kc. voltage are caused to appear across potentiometer 682 during the recording period. The level of the voltage may be adjusted for optimum by the potentiometer 682 and is applied through condenser 680 to recording head 656. The action just described occurs simultaneously in each column wherein a key is depressed. Any column not having a key depressed does not receive any recording. Contacts 686 remain closed when no selection is made in the column to which it is related and as a result the respective junction 694 is connected through a resistor 710 via wire 692 through contacts 686 to the positive line 74. Thus, during the time relay R2 is picked up in the recording cycle and the grid of tube 698 is biased highly negative, the junction 694 is prevented from dropping in potential since it is directly connected through a low impedance 710 and through contacts 686 to line 74. Near the end of the record cycle the hold-up circuit of relay R2 is broken by switch C2 and drops out. The contacts 636 transfer to the position shown and condenser 638 charges through relay coil R4 which closes contact 640. Solenoid coil 56 is thus energized and operates to clear the keyboard and release the motor bar 54 as above described. Should it be desired to clear the keyboard without making an entry, the keyboard 64 may be depressed thus picking up relay R5 and closing R5A points 644 to energize the solenoid 56.

Fig. 11 shows the shapes of the magnetized areas produced by depressing the respective keys marked as indicated by the numbers under each shape, and Fig. 12 shows an IBM card such as used in the above-described machine with typical magnetized areas as produced by the machine.

As pointed out above, the capacities of the condensers 688 vary in proportion to the values of the digits which they represent; and as the cards are fed at a constant rate, the resulting magnetized areas vary in shape as shown. That is to say, the recordings produced by a circuit including a condenser having the greater capacity and consequently the greater rate of discharge, e.g. the circuit for digit "9," will have a shorter portion of decreasing width than the recordings produced by the circuits of the smaller digits.

Cam switch C3 through contacts 646 is used to automatically advance a new card when 12 rows have been recorded on a preceding card. As the card advances through the 12th recording cycle, it passes beyond the card contact switch 63 and drops out relay R1. Contact 646 closes just before shaft 10 completes its rotation and R6 relay coil is momentarily picked up during the charging of condenser 648. The charging current for this condenser flows from wire 74, through wire 618, condenser 648 now closed R1C points 650 through cam contacts 646 through relay coil R6 to line 76. Relay R6 closes R6A contacts 652 to energize the card feed clutch magnet coil 34 from line 74 via wire 618, through contacts 652, wire 620 and contacts 606. The card feed clutch is thus automatically tripped at the end of the 12th recording cycle on each card and feeds the next card up to the record position.

In the foregoing specification I have described my invention as embodied in an apparatus for making magnetic records on IBM magnetizable cards but it will be understood that other mediums may be employed such as tape of magnetizable material.

It will also be understood that means other than the described keyboard may be employed for selecting the values to be recorded and that the control circuits and other features of the apparatus and method of operation may be variously modified in adapting the invention to different purposes. It is therefore to be understood that the invention is not limited to the specific method and apparatus herein described but includes all such modifications thereof as fall within the scope of the appended claims.

I claim:

1. Apparatus for making magnetic recordings comprising means for advancing a magnetizable medium, a recording head positioned adjacent the path of movement of said medium, means for applying an alternating current of predetermined and uniform high frequency to said recording head during such movement for a period of predetermined duration and means for selectively modifying the voltage of said current at a predetermined rate during a selected portion of said period.

2. Apparatus for making magnetic recordings representing different values comprising means for advancing a magnetizable medium, a recording head positioned adjacent the path of movement of said medium, means for applying to said recording head during such movement for a period of predetermined duration an alternating current of predetermined and uniform high frequency, progressively increasing the voltage of said current during a portion of said period, and means for selectively varying the rate of voltage increase in accordance with the value to be recorded.

3. An apparatus in accordance with claim 2 wherein said last mentioned means consists of a series of condensers of different capacities corresponding to the different values to be recorded and means for selectively connecting said condensers to the circuit of the recording head.

4. In an apparatus for making successive magnetic recordings representing different values on a magnetizable medium, the combination of means for advancing said medium in successive steps of predetermined duration, a recording head positioned adjacent the path of movement of said medium, means for applying high frequency alternating current to said recording head during a portion of said advancing movement, means for increasing the voltage of said current at different rates comprising a series of condensers of different capacities corresponding with the different values to be recorded, condenser selecting means for connecting a condenser to the circuit of the recording head, and a control circuit having means for successively initiating the operation of said advancing means, closing the circuit of the recording head, opening the circuit of the recording head after a predetermined period of recording, and stopping the advancing means.

5. The apparatus of claim 4 wherein means are provided for limiting the increasing voltage applied to the recording head to a predetermined maximum and maintaining such maximum voltage until the end of the recording period.

6. In an apparatus for making successive rows of magnetic recordings representing different values on a magnetizable medium, the combination of means for advancing said medium in successive steps of predetermined duration, a row of recording heads positioned across the path of movement of said medium, means for applying high frequency alternating currents to said recording heads during a portion of said advancing movement, means for increasing the voltages of said currents at different rates comprising a series of condensers of different capacities corresponding with the different values to be recorded for each recording head, condenser selecting means for connecting condensers to the circuits of the recording heads, and a control circuit having means for successively initiating the operation of said advancing means, closing the circuits of the recording heads, opening the circuits of the recording heads after a predetermined period of recording, and stopping the advancing means.

7. The apparatus of claim 6 wherein means are provided for limiting the increasing voltages applied to the recording heads to a predetermined maximum and maintaining such maximum voltage until the end of the recording period.

8. In an apparatus for making successive rows of magnetic recordings representing different values on cards of magnetizable material, a row of recording heads, a card magazine, card feeding means for advancing a card from said magazine to said recording heads, then advancing said card in successive periods of predetermined duration across said recording heads in a direction transverse to said row and thereafter discharging said cards, means for applying alternating current of predetermined and uniform high frequency to said recording heads progressively increasing the voltage of said current, during a portion of said successive periods, and means for selectively varying the rates of voltage increase in accordance with the values to be recorded.

9. The apparatus of claim 8 wherein said last named means comprises a keyboard having keys representing the different values to be recorded, a series of condensers of different capacities corresponding to the different values to be recorded and means controlled by said keys for connecting the corresponding condensers to the circuits of said recording heads and discharging said condensers during the recording period.

10. Apparatus for making magnetic recordings comprising means for advancing a magnetizable medium, a recording head positioned adjacent the path of movement of said medium, means for applying an alternating current of predetermined and uniform high frequency to said recording head during such movement for a period of predetermined duration, and means for increasing the voltage of said current at a predetermined rate during a portion of said period and maintaining said voltage for the remainder of said period, at the value to which it is increased during the first portion thereof.

11. The apparatus of claim 10 wherein said last named means includes a condenser of predetermined capacity and means for connecting said condenser during its discharge to the circuit of said recording head.

12. Apparatus for generating and recording wave forms of predetermined shape and dimensions comprising a high frequency oscillator, a triode having a resistor, means for feeding the output of the oscillator to the grid of said triode, a second triode connected in parallel with the first triode to said cathode resistor, means for applying a potential to the grid of said second triode and decreasing such potential at a predetermined rate, and means for recording the wave forms produced during the period of application of said potential.

13. The apparatus of claim 12 wherein the potential applied to the grid of the second triode is derived from a charged condenser and is lowered by discharging the condenser at a predetermined rate.

14. The apparatus of claim 12 wherein a rate of discharge proportional to the capacity of the condenser is obtained by maintaining the current of the discharging condenser at a constant value.

References Cited in the file of this patent

UNITED STATES PATENTS

| | | |
|---|---|---|
| 1,452,032 | Farrington | Apr. 17, 1923 |
| 1,452,339 | Heising | Apr. 17, 1923 |
| 2,080,273 | Holmes | May 11, 1937 |
| 2,168,402 | Fitzgerald | Aug. 8, 1939 |
| 2,247,905 | Bryce | July 1, 1941 |
| 2,560,474 | Potts | July 10, 1951 |
| 2,596,621 | Van Loon et al. | May 13, 1952 |
| 2,624,850 | Vaughan | Jan. 6, 1953 |
| 2,699,498 | Guenther | Jan. 11, 1955 |
| 2,784,392 | Chaimowicz | Mar. 5, 1957 |

FOREIGN PATENTS

| | | |
|---|---|---|
| 986,551 | France | Mar. 28, 1951 |

OTHER REFERENCES

Waveforms, M.I.T. Radiation Lab., vol. 19, copyright 1949, pp. 377–378.